Figure 1:
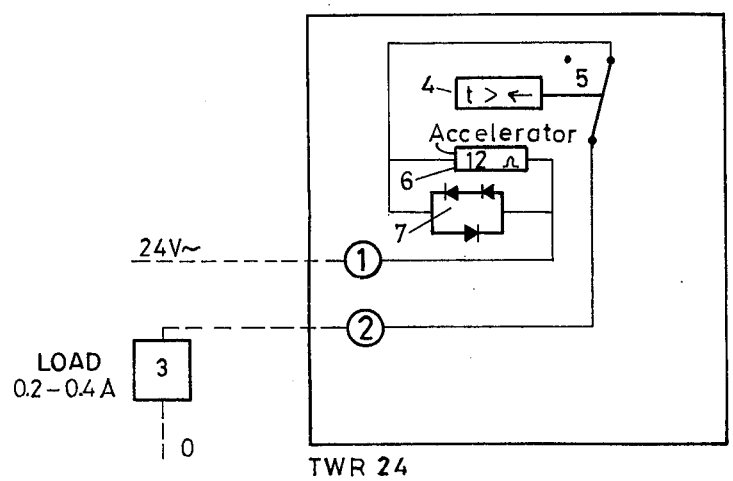

United States Patent [19]
Thorsoe

[11] 3,940,727
[45] Feb. 24, 1976

[54] THERMOSTAT WITH AUTOMATIC ACCELERATOR

[75] Inventor: Flemming Thorsoe, Sonderborg, Denmark

[73] Assignee: Danfoss A/S, Nordborg, Denmark

[22] Filed: Mar. 12, 1975

[21] Appl. No.: 557,480

Related U.S. Application Data

[63] Continuation of Ser. No. 449,067, March 7, 1974.

[30] Foreign Application Priority Data
Mar. 12, 1973 Denmark .......................... 1329/73

[52] U.S. Cl. .................................... 337/1; 307/117
[51] Int. Cl.² ....................................... H01H 61/00
[58] Field of Search .......... 337/1; 307/117; 323/222

[56] References Cited
UNITED STATES PATENTS 3,246,233  4/1966  Herz .................................. 323/22 Z
3,629,607  12/1971  Maddox ................................ 337/1

FOREIGN PATENTS OR APPLICATIONS
645,800  9/1962  Italy .................................. 323/22 Z OTHER PUBLICATIONS
"Silicon Zener Diode & Rectifier Handbook" 3rd Edition Copyright 1961, p. 69, copy in Group 212.

Primary Examiner—Harold Broome

[57] ABSTRACT

The invention relates to a two terminal type thermostat having a switch controlled by a bimetal unit. An accelerator resistor assembly is in the circuit controlled by the switch with the accelerator resistor being in thermal proximity to the bimetal unit. The accelerator resistor assembly includes diode means in parallel with the accelerator resistor with at least two diodes connected in antiparallel relation to each other. In a more specific embodiment at least two diodes are in seris relative to each other.

3 Claims, 2 Drawing Figures

THERMOSTAT WITH AUTOMATIC ACCELERATOR

This is a continuation application of Ser. No. 449,067 filed Mar. 7, 1974.

The invention relates to a thermostat, for instance of the bimetal type, with a set of switches, cutting the load in and out, and an accelerator resistor, thermally connected to the temperature-sensitive element of the thermostat.

Such accelerator resistors (thermal resistors) serve to speed up the heating of the temperature-sensitive element during the period when the switches of the thermostat have cut in a load, for instance a solenoid valve, for delivery of heating power to the room in which the thermostat controls the temperature. What is obtained by this is a cyclic functioning of the thermostat, which is cut out before the room has reached the desired temperature, with relatively short, constant cut-in periods and varying cut-out periods, depending on variations in the heating requirement.

Here an already known procedure is to connect the thermal resistor in parallel with the load (for instance the solenoid of a solenoid valve). Then the full operating voltage will be available to the accelerator resistor, and a constant heating power will be delivered to the thermostat. However, this solution requires a three-wire electricity system for the thermostat, which means high wiring expenses in case thermostat and regulator are located far from each other.

Therefore, an attempt has been made to connect the thermal resistor in series with the load, in which case a two-wire electricity system can be used for the thermostat. However, then the heating power will depend on the load current, meaning that application of solenoid valves of different sizes in connection with the same type of thermostat will result in variation in the heating power emitted by the accelerator resistor. Therefore, different accelerator resistors were needed for different loads, entailing a great many variations, or a variable accelerator resistor had to be applied, adjustable to the load in question.

The operating voltage of such thermostatic control circuits is often 24 volts. The load current of normally applied solenoid valves is of 0.2–0.4 ampere. Consequently, the permissible power arrested in the accelerator resistor is limited. A typical value is about 0.1 watt.

It is the object of the invention to specify a thermostat the accelerator resistor of which is connected in series with the load and emits a constant heating power, independent of the value of the load.

According to the invention this is obtained by connecting, in parallel with the accelerator resistor, two diode circuits, connected in antiparallel.

What is obtained thereby is that only the diode voltage drop of a value of 0.7 volt per diode influences the accelerator resistor in both directions of the current, and consequently the power emitted by the accelerator resistor will be constant, irrespective of the load.

Adaptation to thermal conditions and the accelerator resistor is obtained if one of the diode circuits is or both of them are replaced by two or more diodes, connected in series and equally phased.

FIG. 1 shows an embodiment in which 24 volts AC is fed to terminal 1 of the thermostat, and the load 3 is connected, at one end, to the other terminal of the AC supply and at the opposite end to terminal 2 of the thermostat. The thermostatic element 4 is shown only schematically and can be of the bimetal type. It will cut the load in and out via a switch 5, connecting the terminals 1 and 2. Between terminal 1 and one side of the switch an accelerator resistor 6 is connected, heated by the load current and cutting out the thermostat before the room which is to be heated has reached the temperature to which the thermostat has been set. Then the resistor is cooled, and the thermostat is cut in again until the resistor has again heated the temperature-sensitive element of the thermostat. Such cutting-in and -out will continue until the desired room temperature has been reached successively.

To ensure that the output of the accelerator resistor is independent of the load applied a complex of diodes 7, connected in antiparallel, is connected in parallel with the load. In the embodiment shown one of the diode circuits comprises two diodes, connected in series, and the other circuit comprises one diode, connected in antiparallel with the former circuit. The number of diodes can be adapted to the resistor 6 to ensure the required heating power. As the diodes applied have a diode voltage drop of 0.7 volt, the voltage via the resistor will, in one half-period, be 0.7 volt and in the other half-period 1.4 volts. So, the average power desired in the embodiment is of 0.1 watt, the value of resistance having been fixed to be 12 ohms.

The resistor 6 must be of a type matching the diodes and thermal conditions, and the diodes must be of types which are operative — within the range of current variation desired (in the embodiment 0.2–0.4 ampere) — partly along the straight part of the characteristic and partly under the load required.

Figure 2:
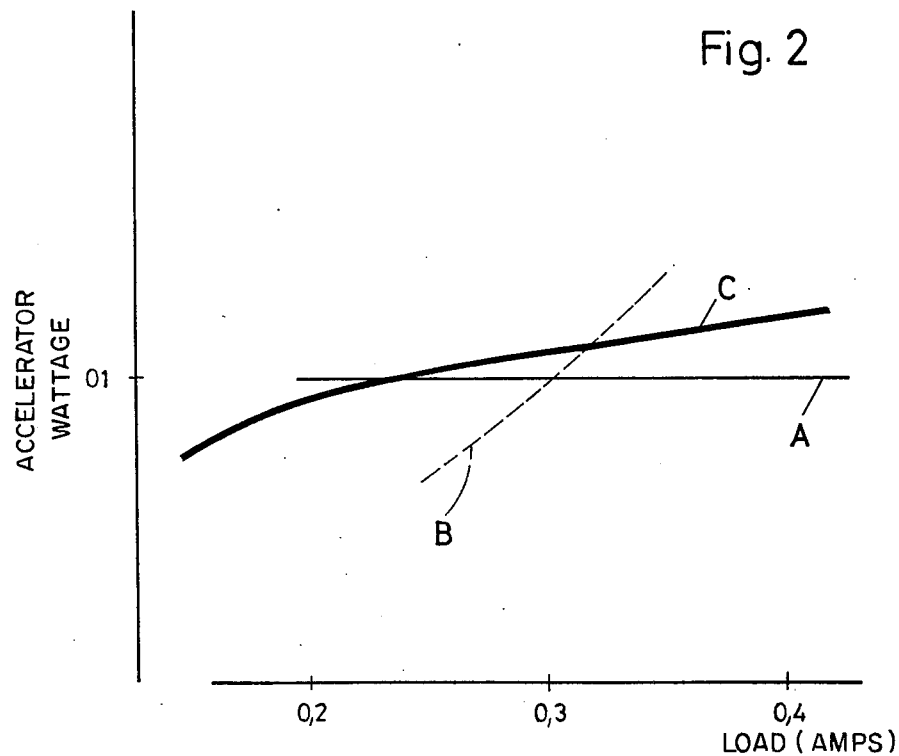

FIG. 2 shows the power arrested in the accelerator resistor as a function of the load current.

In thermostats known so far with adjustable accelerator resistors the latter had to be adjusted to a certain load, an intricate job requiring a specialist. However, the desired output could always be obtained in that way (graph A).

Another method was to connect different resistors to otherwise identical thermostats, and then to specify a certain load current for each individual thermostat (dotted graphs B).

The solid graph (C) shows that the output of the accelerator resistor of the thermostat according to the invention is practically constant within the range of current applied in the embodiment, i.e. 0.2–0.4 ampere.

I claim:

1. A thermostat assembly comprising only two terminals, conductor means forming a series circuit between said terminals, a switch in said circuit, temperature responsive bimetal means for operating said switch, a load in said circuit, an accelerator resistor assembly in said circuit in series with said load, said assembly including an accelerator resistor and diode means in parallel therewith, said diode means being arranged to operate with forward voltage drop thereacross to control the voltage drop across said resistor when current is admitted to said circuit through one of said terminals in the direction of said forward voltage drop.

2. A thermostat assembly according to claim 1 wherein said diode means include diodes arranged in two antiparallel paths.

3. A thermostat assembly according to claim 2 wherein one of said paths includes at least two diodes connected in series and poled in the same direction.

* * * * *